Figure 1:
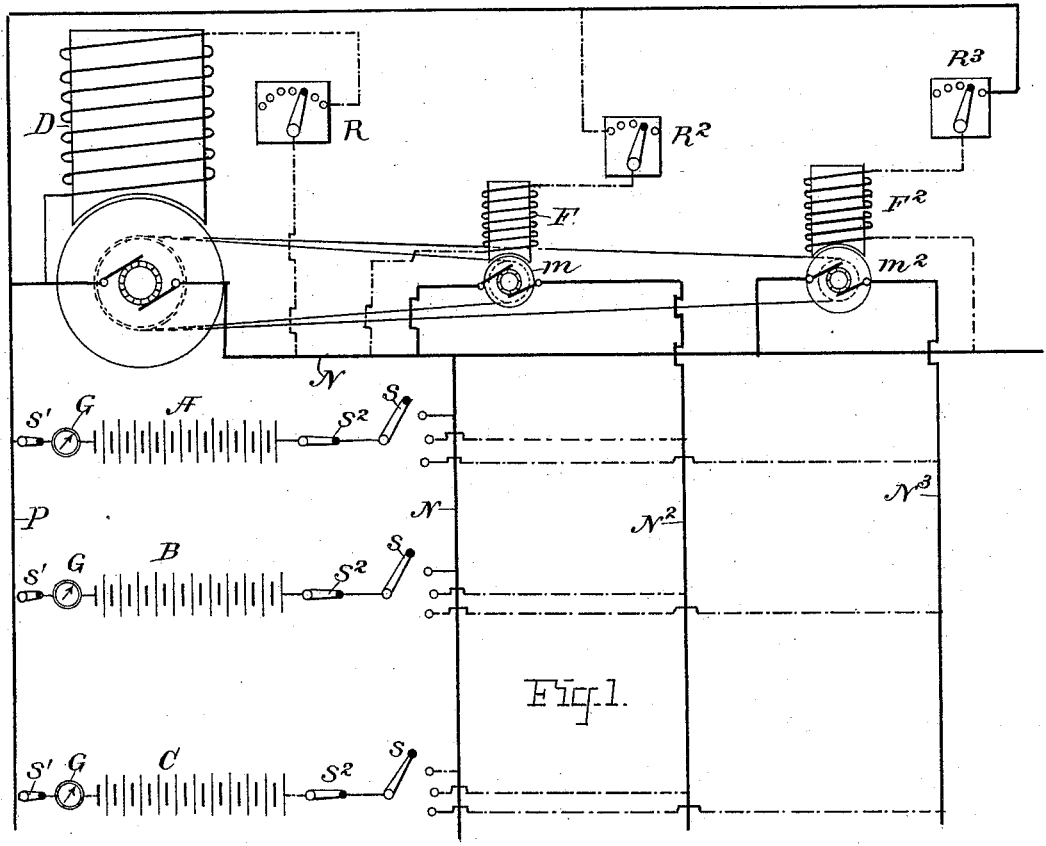

(No Model.) 3 Sheets—Sheet 1.

C. O. MAILLOUX.
APPARATUS FOR CHARGING SECONDARY BATTERIES.

No. 467,546. Patented Jan. 26, 1892.

ATTEST: J. Hurdle, T. F. Courey

INVENTOR: Cyprien O. Mailloux
By H. C. Townsend
Attorney (No Model.) 3 Sheets—Sheet 2.

C. O. MAILLOUX.
APPARATUS FOR CHARGING SECONDARY BATTERIES.

No. 467,546. Patented Jan. 26, 1892.

ATTEST:

INVENTOR:
Cyprien O Mailloux

By H. C. Townsend
Attorney

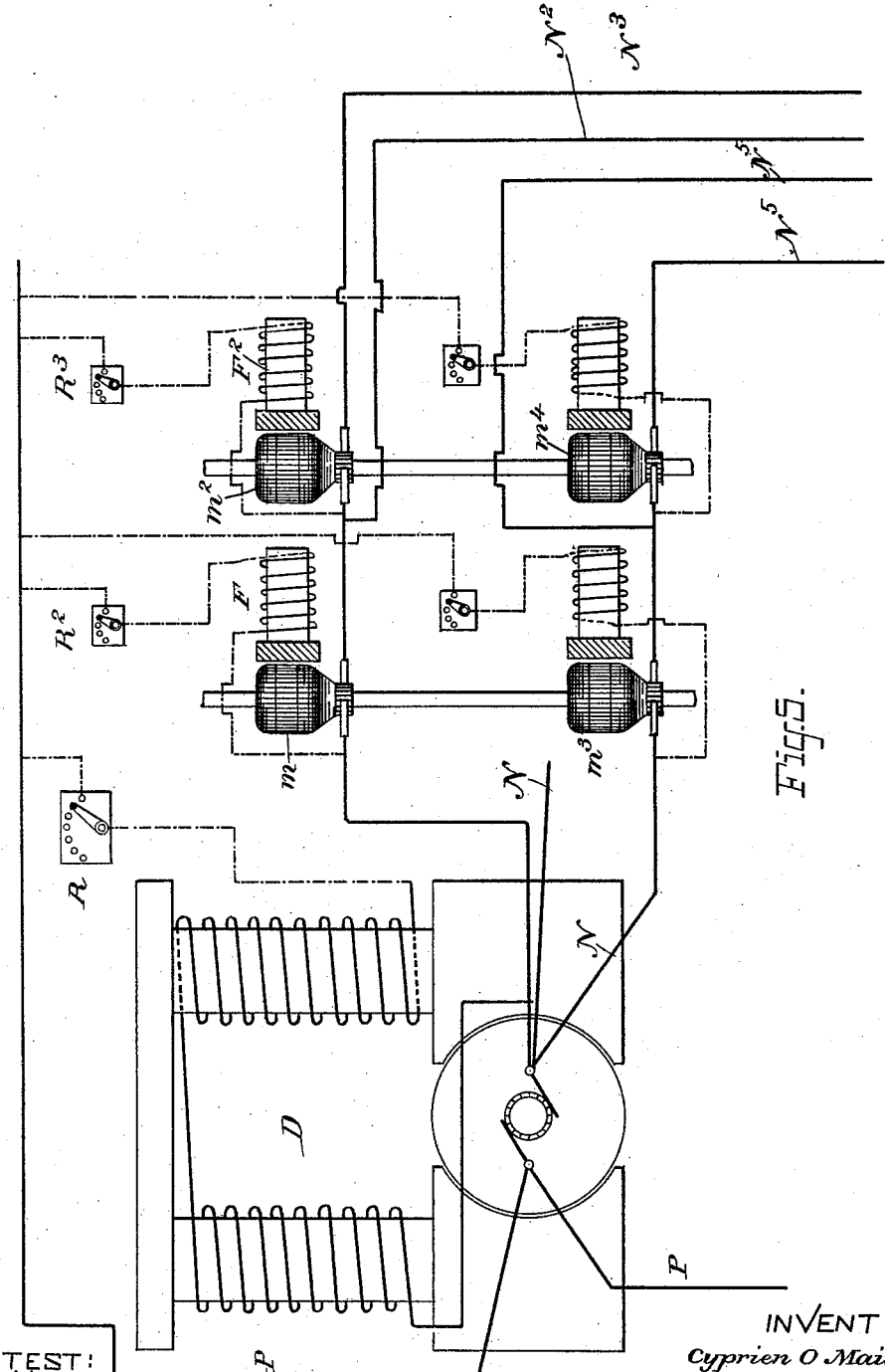

UNITED STATES PATENT OFFICE.

CYPRIEN O. MAILLOUX, OF NEW YORK, N. Y.

APPARATUS FOR CHARGING SECONDARY BATTERIES.

SPECIFICATION forming part of Letters Patent No. 467,546, dated January 26, 1892.

Application filed April 24, 1891. Serial No. 390,279. (No model.)

*To all whom it may concern:*

Be it known that I, CYPRIEN O. MAILLOUX, a citizen of the United States, and a resident of New York, in the county of New York and State of New York, have invented certain new and useful Apparatus for Charging Secondary Batteries, of which the following is a specification.

My invention relates to apparatus for charging secondary or storage batteries employed in electric-railway traction or for other purposes, and is especially useful in those cases where the charging has to be done on a large scale and a large number of batteries of the same or different number of cells in series require to be charged at or about the same time.

My invention provides a means whereby the charging-current may be regulated or controlled in a reliable manner with certainty and precision and without loss of efficiency.

In the operation of charging storage-batteries it is desirable to make some provision for controlling or adjusting the charging-current, either to accommodate it to batteries having a different number of cells in series or for the purpose either of maintaining a flow of charging-current at a practically constant amount during the whole or a part of the charging period, as the counter electro-motive force of the battery rises, or to adjust or vary the charging-current at different stages of the operation—as, for instance, to permit the battery to begin charging at a rapid rate and to gradually diminish the rate as the charging is completed.

For the purpose of obtaining the control necessary to various stages of the charging operation or to varying number of cells in series it has been the practice heretofore to provide a dead-wire resistance consisting of a conductor opposing a resistance to the flow of the current because of the low specific conductivity of the material opposing it, such resistance being put into the circuit between the battery and charging source and adjusted to the particular size of battery or to the particular state of the charging operation and counter electro-motive force of the battery, as desired. In the ordinary way of charging batteries the procedure would be to put in a large amount of this resistance at the beginning of the charging operation when the counter electro-motive force of the battery is low, and then to cut out the resistance as the charging progresses and the counter electro-motive force of the battery rises, so that the charging-current may be kept up to the proper strength required for the operation of charging either at a constant rate or at a gradually diminishing rate. It will be obvious that with such a device a great deal of the energy is wasted at the beginning of the operation, since the potential of the charging source must be adjusted to the maximum counter electro-motive force of the battery existing therein toward the close of the charging operation, and at the beginning of the operation the surplus energy of the charging source must be taken up in the resistance. On account of this constant waste of energy, caused by the heating effect of the current passing through it, their cumbersomeness and the complications of circuits and construction required, these resistances are very objectionable.

The objects of my invention are to obviate the necessity of using such resistances and to provide a much simpler and more perfect means for effecting the current regulation or control.

My invention consists, first, in the combination, with the main charging-dynamo and the storage-battery to be charged thereby, of a supplemental armature or armatures acting as a source of supplemental electro-motive force, which may assist either that of the main charging-dynamo or the counter electro-motive force of the battery, and suitable switch devices whereby the said supplemental armature may be connected into the circuit with the main charging-dynamo and the battery at pleasure or thrown out of the charging-circuit at pleasure.

My invention consists, further, in an apparatus for charging storage-batteries of a main charging-dynamo, two or more supplemental armatures acting as electro-motive-force generators, assisting the main charging-dynamo or the battery, and electric-switch devices whereby the supplemental armatures may be connected into the circuit singly or in combination in different ways, according to the state of charge of the battery.

My invention consists, also, in the combination, with charging mains or conductors having a definite maintained difference of potential, of separate branches therefrom containing supplemental armatures, which act as electro-motive-force generators, assisting either the potentials of the main or the counter electro-motive force of the battery, and are of different power or adjusted capacity, and suitable switch devices, whereby a storage-battery may be connected to any one of said branches at pleasure.

My invention consists, further, in the organizations of apparatus and combinations of devices hereinafter described, and then specified in the claims.

In carrying out my invention, the supplemental armatures may all act to give an electro-motive force, assisting that of the main charging-dynamo, or all may act to assist the counter electro-motive force of the battery, or some may act in one way and some in another. They also may be combined with the circuits in different manners, the switches being, however, provided with the suitable contact points or connections, whereby the said supplemental armatures may be connected into the circuit with the charging-dynamo and the battery to be charged to give a resultant current-flow, adapted either to the state of charge of the battery or to the number of cells thereof in series with one another. When the armature used as the source of supplemental motive force has its field suitably excited and is driven by any prime mover, it will operate as a generator, whose electro-motive force will supplement that of the charging-main source or main, and when so operated with the proper polarity of magnetic field or connection of its armature into the circuit the initial potential difference of the source of supply may be, if desired, and is preferably taken somewhat lower than is necessary to force current through the battery in opposition to the counter electro-motive force thereof. This initial electro-motive force is in such case raised or supplemented by the action of the auxiliary armature or armatures employed by including the proper one for the proper combination of such armatures in the circuit to give an electro-motive force due to the initial and supplemental electro-motive force sufficient to send the desired current through the battery in opposition to the counter electro-motive force and resistance encountered therein. It is well known that as the operation of charging secondary batteries proceeds their electro-motive force rises, so that they oppose to the initial electro-motive forces of the source of supply a constantly-increasing power. If it is desired to bring the charging-current up to the normal amount after the battery has been in the circuit of the charging-current for some time, it can be done by operating the switch, so as to bring into circuit a second auxiliary armature in series with the first or to bring into circuit a different armature having a greater electro-motive-force capacity than that at first in use, and this operation can be repeated through the operation of charging the battery any desired number of times, depending upon the range and variations of electro-motive force provided by the number of supplemental armatures employed. If the magnetic field of the armature be reversed, said armature becomes related differently to the initial and counter electro-motive forces involved. Its action will now supplement the counter electro-motive force of the battery, instead of the initial electro-motive force of the source of supply. In this case the initial electro-motive force of the main charging-dynamo is preferably made as high as or higher than the highest value that will be required to force a current through the groups of cells when the said cells have reached the phase of highest counter electro-motive force, which occurs toward the end of the charging process. If the armature now be run by the charging-current as an electric-motor armature, the electric energy expended in such motor in giving it rotation and capacity to do mechanical work is abstracted from the charging-circuit in which the armature is for the time being connected and causes a counter electro-motive force in the circuit in the same direction as the counter electro-motive force of the cells being charged. If a number of such armatures are provided, then at the beginning of the charge, when the cells oppose the least counter electro-motive force, a motor or combination of motors giving a large counter electro-motive force would be connected by the switch into circuit with the battery. As the charging proceeds and the counter electro-motive force of the battery rises the supplemental counter electro-motive force produced by a motor armature or armatures would be diminished by bringing into circuit a different motor-armature or by cutting out one or more of the motor-armatures first interposed in the charging-circuit. In this way the charging-current can be controlled or changed to any desired extent. The regulation can be controlled so as to obtain a charging-current which will be of substantially the same value throughout the charging operation, or the charging-current or rate of charge may be either increased or diminished toward the close of the charging, such increase or diminution depending upon the relative decrease of such counter electro-motive force that is made to accompany the increases of counter electro-motive force in the battery. Instead of using all the armatures of the plant in the same way, some might be used as motor-armatures and some as generator-armatures driven by the prime mover. The energy expended in a motor is not totally wasted, as in the case of a dead resistance heretofore used, but is available for use by being reconverted into mechanical energy and can be utilized in various ways, the only losses being those incident to conversion. To avoid loss from this source, I preferably gear or connect the motor to the same prime mover as that which supplies the charging energy. Such utilization of the energy of the motor into mechanical energy tending to drive the source of charging energy, forms one of the valuable features of my present invention.

Figure 2:
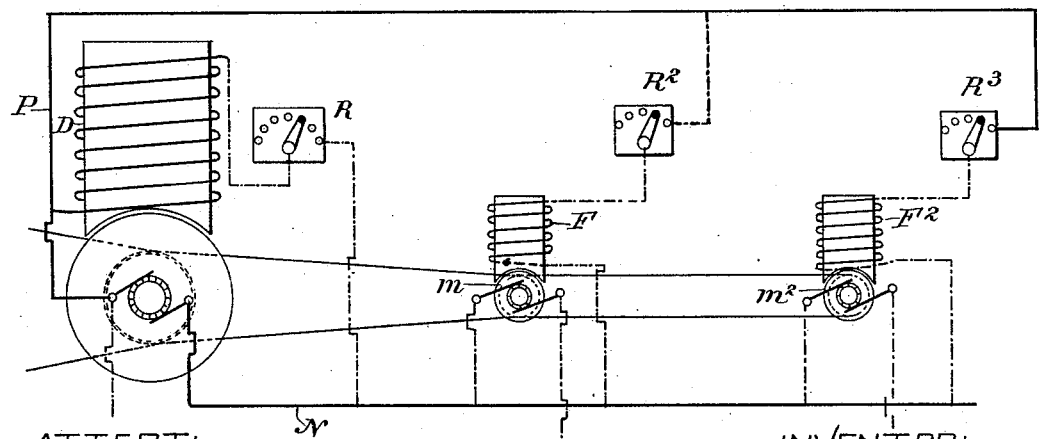
Figure 3:
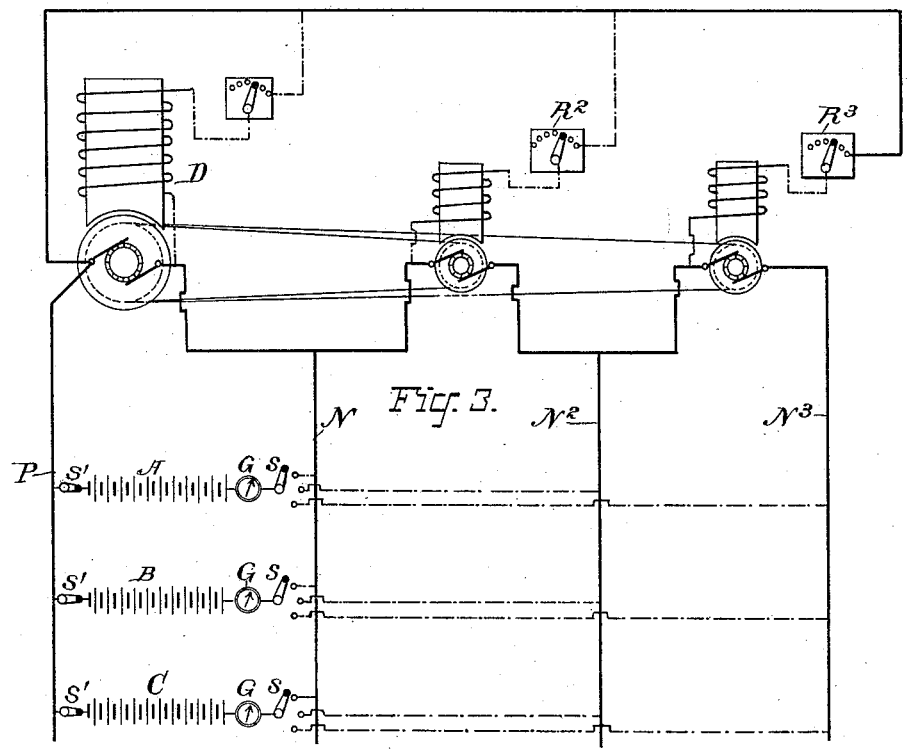
Figure 4:
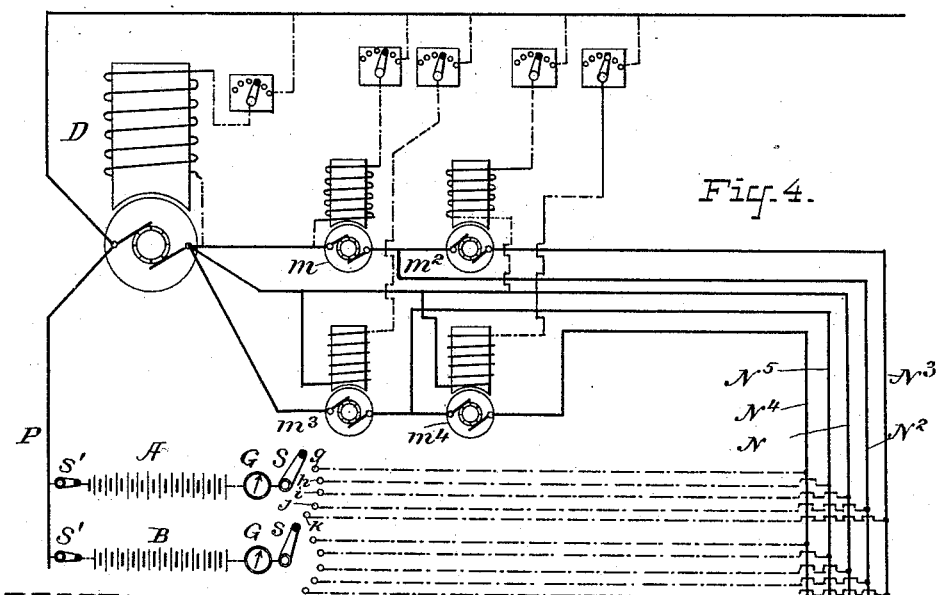

In the accompanying drawings, Figure 1 is a diagram of an apparatus embodying my invention. Fig. 2 illustrates a modification in the manner of mechanically connecting the supplemental armatures. Fig. 3 illustrates a modification in the disposition of the supplemental armatures in the circuits. Fig. 4 is a diagram illustrating the combined use of motor-armatures and armatures acting as generators of the charging energy. Fig. 5 illustrates a modification in the manner of mechanically connecting two supplemental armatures or electro-motive-force generators together.

Referring to Fig. 1, D indicates any dynamo-machine preferably constructed to keep a constant potential difference at its terminals and connected to leads or wires P N, between which one or more storage-batteries A B C, &c., to be charged may be connected. The mains or leads P N may obviously be supplied with energy from any number of dynamos, such as D, in the well-known manner. The dynamo D preferably has its field excited in shunt from the mains and has a resistance connected in such shunt for the obvious and usual purpose.

In branches from a conductor leading from one or the other terminal of the machine are placed the armatures $m$ $m^2$, &c., of supplemental dynamo-electric or electro-dynamic machines operating as the supplemental electro-motive-force generators of my invention. These branches are continued after passing through the machine into leads or wires $N^2$ $N^3$, which may form the supplemental charging leads or mains similar to N, but of different potential in so far as the armatures $m$ $m^2$ in the branches serve to modify the main charging-potential obtained from the machine or machines D.

S' S² are suitable switches or other devices, whereby a battery to be charged may be connected into a circuit between a lead, as P, and switch devices whereby its opposite terminal may be connected at pleasure with any one of the leads or wires N N² N³ at pleasure.

G G, &c., are suitable current-indicating devices in the circuits of the batteries.

The switches S are provided, as shown, with suitable contacts or connecting-wires whereby connection may be made with any one of the leads N N² N³.

The armatures $m$ $m^2$ revolve in suitable magnetic fields independently excited by current from the main dynamo which is passed through the field-coils and through a suitable variable resistance $R^2$ $R^3$, by means of which the electro-motive-force capacity of each armature may be varied or regulated, if desired.

The supplemental machines or generators $m$ $m^2$ of electro-motive force (counter or assisting) should normally have different capacities or be adjusted to have different effects upon their respective branches or portions of circuit including them. This difference may be obtained by differences in the initial construction of the machines or by differences in the adjustment of their magnetic fields. It is obvious that the system might be extended to include one or more additional supplemental armatures and branches. If the armatures $m$ $m^2$ are run as electro-motive-force generators assisting the main dynamo D, then they are operated by any suitable mechanical motive power, and in this case the difference of potential at the terminals of the main machine may be made just sufficient to force the proper charging-current through any battery at the beginning of the charging operation. The auxiliary armatures will then supplement the electro-motive force of the main dynamo by assisting it, and there will be with such an organization a certain potential difference due to the power of the main machine, variable between the leads P and N, a still greater difference available between P and $N^2$, and a third greater potential available between P and $N^3$, assuming that the electro-motive-force capacity of $m^2$ is larger than that of $m$.

If the potential of the main machine is sufficient for the beginning of the operation, the switch S, connected to the circuit of any battery to be charged, will be first turned to connect the battery with the main N. After the operation of charging has proceeded for a certain time, the length of which depends upon the conditions of the case, the charging-current, as will be shown at G, will become reduced in consequence of the rise in the counter electro-motive force of the battery. The switch S would then be turned to connect the battery to the main or lead $N^2$, thus throwing into the charging-circuit the supplementing electro-motive force of $m$, which aids that of the main charging source. The charging may then progress for a definite time under the influence of the difference of potential between P and $N^2$, and after a time the switch may be turned again to cut off the electro-motive-force generator $m$ and connect to the lead $N^3$, so as to bring in the electro-motive-force generator $m^2$ of larger power and thus raise the potential, so as to keep up a charging-current of the proper amount. This operation might be continued to include additional mains or leads, so as to provide for adjustments at a larger number of stages or times during the charging operation and made necessary by the increases of counter electro-motive force in the battery.

It will be obvious that the operation of charging any battery A B C may be carried on independently of the charging of the others and the adjustments described be made independently. The arrangement is also available for the charging of batteries having different numbers of cells in series, either by varying the normal capacities of the armatures $m$ $m^2$, or by using different ones of said supplemental armatures for batteries having a smaller number of cells.

I have thus far described the small supplemental machines as so related to the charging-dynamo as to operate to assist the charging-current, such armature being driven by any suitable prime mover. I will now describe the action of the armature when related to the circuits, so as to operate as a motor driven by the charging-current. In this case the electro-motive force of the main source must be relatively higher instead of being lower than is required to force current through a battery when the latter has nearly finished charging. The armature would be caused to turn by the current passing through the branch as a charging-current to charge the battery. The electro-motive force of the armature now assists that of the battery, instead of assisting that of the dynamo D, thereby practically reducing the potential difference available from the dynamo D for charging a battery. The greater the electro-motive-force capacity of the supplemental machine in circuit with the battery the lower will be the charging-current. Hence when the electro-motive-force capacity of the battery is at its lowest and the potential difference required to produce the proper charging-current is less the counter electro-motive force furnished by a supplemental machine would be greater than toward the close of the operation. By means of the switch S the desired adjustment is secured by throwing into circuit that machine or armature $m$ $m^2$, &c., at the beginning of the operation, which has the greater counter electro-motive force. As the charging-current falls away with the increase of counter electro-motive force of the battery, a motor-armature of less counter electro-motive force will be thrown into circuit. The product of the counter electro-motive force produced by the small machine into the current passing through the armature represents in watts the energy abstracted from the branch circuit and made available for conversion into mechanical energy of motion. Hence if the motor is belted or geared to the main dynamo D or the prime mover supplying the power thereto the mechanical energy resulting from the conversion will reduce by an amount equal to the said energy the power required to drive the main dynamo.

Instead of belting the armature of the supplemental dynamo to the shaft of the main dynamo in the manner indicated in the diagram Fig. 1, the two armatures might be mechanically connected in any of the ways common in the arts—as, for instance, in the same manner that the armatures $m$ $m^3$ are shown connected in Fig. 5.

It will be obvious that by an arrangement such as shown in Fig. 1, where each switch S controls the different potentials furnished by the different leads N $N^2$ $N^3$, with a small number of machines a large number of batteries may be charged at once, the number not being limited by the number of supplemental machines employed.

As an illustration of the practical working, I will assume that the batteries A B C, &c., each consists of one hundred cells of the Planté type, requiring a potential difference of 2.1 volts per cell at the beginning and 2.35 at the end of charge to maintain the proper charging-current. The potential difference employed must therefore vary between 2.10 and 2.35 at the terminals of each group. If both $m$ and $m^2$ were to be assumed to act as generators, the electro-motive force of the dynamo D would be made about two hundred and ten volts, that of $m$ would be adjusted at about fifteen volts and that of $m^2$ at about twenty-five volts. The cells would begin to charge with the potential from the dynamo D alone. After a time the switch would be turned so as to include the potential of machine $m$, making (two hundred and ten plus fifteen) two hundred and twenty-five volts. When the current has again fallen to a low value, in consequence of the rise in the counter electro-motive force of the cells, the switch is moved so as to bring the group under the combined potentials of D and $m^2$, giving (two hundred and ten plus twenty-five) two hundred and thirty-five volts.

Assuming now that the machines $m$ $m^2$ act as motors, the dynamo D would in this case be adjusted to give two hundred and thirty-five volts. At the beginning of the charge the battery would be connected through the machine $m^2$, giving a resultant potential of (two hundred and thirty-five minus twenty-five) two hundred and ten volts. After a time the battery would be transferred to $m$, giving a voltage of (two hundred and thirty-five minus fifteen) two hundred and twenty, and lastly the charging would be finished at the full potential two hundred and thirty-five of the dynamo D. Assuming now that one machine $m$ operates as a motor (fifteen volts) and the other $m^2$ as a generator (ten volts) the potential of dynamo D would be adjusted at two hundred and twenty-five. The charging would begin with the motor $m$, included in circuit, the available potential being the difference (two hundred and twenty-five minus fifteen) two hundred and ten volts. After a time the battery would be connected to the dynamo D alone; and, lastly, the charging would be finished with the combined potentials of D and $m^2$, (two hundred and twenty-five plus ten) two hundred and thirty-five volts. The latter plan is that which I prefer to follow in practice.

Fig. 2 shows a modification which I usually adopt with this plan. Instead of belting the machines $m$ $m^3$ individually to the dynamo or the prime mover, I belt only one of them and then belt the two machines to each other. In practice I sometimes combine the two supplemental machines into one by mounting them upon the same shaft, as indicated in Fig. 5. The advantage of thus combining the supplemental generator and the motor-armatures is that the power required to be taken from or returned to the prime mover is much less than by the other ways, being equal to the difference between the amounts of energy in action at each machine. In actual practical working when a large number of batteries are at different phases of charge, the adjustments may be made such that practically very little power is transferred to or from the prime mover, the amounts absorbed and returned being nearly balanced, so as to nearly offset each other.

Fig. 3 shows another modification which possesses some advantages. The connections are the same as in Fig. 1, with the exception of the armatures $m$ $m^2$, which are connected in series with each other and with the armature of dynamo D instead of in parallel. Sub-mains or leads extend from intermediate portions of the series of machines and from the end of the series, as indicated at $N^2$ $N^3$, and the switches S are provided with contacts connecting to said sub-mains or leads. When the switch is on the contact connecting directly with N, the dynamo D is alone in action. When it makes contact with the next point leading to $N^2$, the main charging-machine and the supplemental armature $m$ are combined in series, while when it connects with the terminal contact leading to $N^3$ the main charging-machine has its electro-motive force combined with that of both $m$ and $m^2$.

Fig. 4 illustrates the manner in which connections may be made when the arrangement illustrated in Fig. 3 is employed, using two or more supplemental machines as motors and two or more as dynamo-electric generators. The dynamo-electric generators are indicated at $m$ $m^2$ and the motors $m^3$ $m^4$. The two machines $m$ $m^2$, whose electro-motive force, either singly or together, can be added to that of the main charging machine or source, are connected the same as in Fig. 3 to the contacts of the switches, and the machines $m^3$ $m^4$, whose electro-motive force, either singly or together, oppose that of the main charging-dynamo and assists that of the battery, have similar connections to additional switch-contacts.

It will be obvious that in the case of the machines arranged in series, as in Figs. 3 and 4, the supplemental machines may have the same electro-motive-force capacity.

The arrangement shown in Fig. 4 may be used as follows: By moving the switch S to make contact with switch-stud $g$ the particular battery controlled by said switch will receive the combined action of the main dynamo and the motors $m^3$ $m^4$, as will be seen by following the connections, the available potential being that of the main charging-dynamo, less the combined counter electro-motive force of the two armatures $m^3$ $m^4$. By moving the switch to $h$ the motor $m^4$ is cut out. At $i$ the batteries receive the action of the dynamo D alone. At $j$ the dynamo is supplemented by the machine $m$, whose electro-motive force assists that of D. At $k$ it is supplemented by both $m$ and $m^2$. The small machines are preferably connected together and to the prime mover, as before, so that energy may be transferred to or from said prime mover as the conditions of operation require.

It will be clearly understood by reference to the drawings that any number of groups may be connected simultaneously to these charging-mains. It is only necessary that the armatures $m$ $m^2$ $m^3$, &c., shall have sufficient current-carrying capacity to carry the current passing through them without undue heating or undue drop of potential. Each battery or group of batteries A B C, &c., as will be readily seen, can be successively connected to the potentials that are appropriate for its rate or its phase of charge without interfering in the least with the other groups of cells. Moreover, the present arrangement renders it possible to charge batteries having different numbers of cells in series and consequent different electro-motive force.

The particular arrangements and combinations of apparatus illustrated in Fig. 4 are not claimed herein, as they form the subject of special claims in another application for patent filed by me of even date herewith, Serial No. 390,280; nor do I claim herein, broadly, that improvement in charging storage-batteries which consists in supplementing the electro-motive force of the battery or the main charging source either or both in accordance with the increase of electro-motive force of the battery during the charging operation, as this improvement forms the subject of broad claims in another application for patent filed by me of even date herewith, Serial No. 390,275.

What I claim as my invention is—

1. In an apparatus for charging storage-batteries, the combination, substantially as described, of a main charging dynamo or source, a supplemental electro-motive-force generator acting either to assist the counter electro-motive force of the battery or that of a charging source, and a switch and connections whereby said supplemental generator may be thrown into or out of the charging-circuit, including the main generator and the battery, according to the state of charge and counter electro-motive force of the latter.

2. In an apparatus for charging storage-batteries, the combination, substantially as described, of a main charging source of definite maintained potential, and a series of supplemental electro-motive-force generators assisting either the electro-motive force of the battery or that of the main charging source, and a series of electric switches having connections, as described, whereby either of a number of batteries being charged may be connected at pleasure with the main charging-dynamo through different supplemental generators or combinations of generators in accordance with the state of charge of each particular battery.

3. In an apparatus for charging storage-batteries, the combination, with the main charging dynamo or dynamos, of supplemental armatures acting as supplemental electro-motive-force generators, and electric-switch devices whereby said supplemental armatures may be connected into the circuit with the charging-dynamo and the battery to be charged, according to the state of charge of said battery.

4. The combination, in an apparatus for charging storage-batteries by one or more main charging-dynamos, of a series of supplemental dynamo-electric or electro-dynamic machines of normally-different (as when in multiple) electro-motive-force capacity, and a switch and connections whereby the battery to be charged may be connected into the circuit of said supplemental machines and the charging-machine to give different electromotive forces adjusted to the acquired charge of a battery.

5. In an apparatus for charging storage-batteries, the combination, substantially as described, of a main charging dynamo or dynamos, a series of supplemental dynamo-electric or electro-dynamic machines having a range of differing electro-motive force substantially limited by the variations of potential ordinarily required in charging the batteries, and switch devices and connections whereby the battery to be charged may be connected into the circuit with the main dynamo and different supplemental machines as the counter electro-motive force of the battery rises in charging.

6. In an apparatus for charging storage-batteries, the combination, with one or more charging-dynamos, of two or more supplemental dynamos of different adjusted electro-motive-force capacity and connected to the circuits of the main dynamo to give an assisting electro-motive force thereto, and switch devices whereby a battery may be connected with the main dynamo through different supplemental dynamos, as and for the purpose described.

7. In an apparatus for charging storage-batteries, the combination, substantially as described, of one or more main charging-dynamos, a series of charging dynamo-electric or electro-dynamic electro-motive-force generators having differing electro-motive-force capacity, and a series of switches, each having connections in multiple to said supplemental generators, whereby each of a number of batteries being simultaneously charged may have the supplemental generators connected in turn into the circuit with said battery and the main charging-dynamo as the electro-motive force of the battery rises in charging.

8. In an apparatus for charging storage-batteries, the combination, with one or more main charging-dynamos, of a series of supplemental electro-motive-force generators of differing or graduated capacity connected in multiple to said dynamo, and a series of switches, each having contacts connected severally with the said supplemental generators, whereby either of a series of batteries being charged may be connected by its switch with any supplemental generator, so as to place said supplemental generator in circuit with the charging-dynamo, and thereby adjust the strength of the charging-current to the particular state of charge of any of the batteries receiving a charge from the main dynamo.

9. In an apparatus for charging storage-batteries, the combination, with mains having a definite maintained potential, of a series of supplemental charging-dynamos of graduated capacity connected in multiple therewith and assisting the main charging-current, and a series of switch devices, each having connection with said supplemental dynamos, whereby the battery connected to any switch for charging may be connected with the charging-main through said supplemental charging-dynamos in turn.

Signed at New York, in the county of New York and State of New York, this 22d day of April, A. D. 1891.

CYPRIEN O. MAILLOUX.

Witnesses:
WM. H. CAPEL,
T. F. CONREY.